United States Patent
Yodose et al.

(10) Patent No.: US 12,303,912 B2
(45) Date of Patent: May 20, 2025

(54) SEPARATION METHOD FOR VALUABLE RESOURCES

(71) Applicant: DOWA ECO-SYSTEM CO., LTD., Tokyo (JP)

(72) Inventors: Tatsuya Yodose, Tokyo (JP); Ryoei Watanabe, Tokyo (JP); Hitoshi Sasaki, Tokyo (JP); Chihiro Nishikawa, Tokyo (JP); Yoshihiro Honma, Tokyo (JP)

(73) Assignee: DOWA ECO-SYSTEM CO., LTD., Tokyo (JP)

( * ) Notice: Subject to any disclaimer, the term of this patent is extended or adjusted under 35 U.S.C. 154(b) by 236 days.

(21) Appl. No.: 17/797,548

(22) PCT Filed: Jan. 29, 2021

(86) PCT No.: PCT/JP2021/003280
§ 371 (c)(1),
(2) Date: Aug. 4, 2022

(87) PCT Pub. No.: WO2021/157483
PCT Pub. Date: Aug. 12, 2021

(65) Prior Publication Data
US 2023/0083016 A1    Mar. 16, 2023

(30) Foreign Application Priority Data
Feb. 6, 2020    (JP) .................. 2020-018752

(51) Int. Cl.
*B03B 9/06*     (2006.01)
*B03C 1/00*     (2006.01)
(Continued)

(52) U.S. Cl.
CPC .................. *B03B 9/06* (2013.01); *B03C 1/00* (2013.01); *B07B 7/01* (2013.01); *B09B 3/35* (2022.01);
(Continued)

(58) Field of Classification Search
CPC .... B03C 1/00; B03C 1/02; B03C 1/10; B03C 2201/20; B07B 7/01; B03B 9/06; B09B 3/35; B09B 2101/16
See application file for complete search history.

(56) References Cited

U.S. PATENT DOCUMENTS

2018/0141087 A1\*  5/2018  Ivanovich Orsyk .... B07B 11/02
2019/0060957 A1\*  2/2019  Burukin ................ F04D 19/002
(Continued)

FOREIGN PATENT DOCUMENTS

JP    2015-170480    9/2015
JP    2015-219948    12/2015
(Continued)

OTHER PUBLICATIONS

Iwata K (JP-2017004920-A Machine translation dated May 24, 2024)) (Year: 2017).\*
(Continued)

*Primary Examiner* — Michael McCullough
*Assistant Examiner* — Kalyanavenkateshware Kumar
(74) *Attorney, Agent, or Firm* — Greenblum & Bernstein, P.L.C.

(57) ABSTRACT

Provided is a sorting method for valuable resources, including a thermal treatment step of thermally treating a target containing valuable resources, to melt aluminum and separate a melt, a pulverizing step of pulverizing a thermally treated product remaining after the melt is separated, to obtain a pulverized product, a magnetic sorting step of sorting the valuable resources from the pulverized product by a magnetic force, and a wind force sorting step of sorting one valuable resource from another valuable resource in the valuable resources by a wind force.

7 Claims, 1 Drawing Sheet

(51) Int. Cl.
  *B07B 7/01*    (2006.01)
  *B09B 3/35*    (2022.01)
  *H01M 10/54*   (2006.01)
  *H01M 50/119*  (2021.01)
  *B09B 101/16*  (2022.01)
  *C22B 7/00*    (2006.01)

(52) U.S. Cl.
  CPC ......... *H01M 10/54* (2013.01); *H01M 50/119* (2021.01); *B03B 2009/066* (2013.01); *B03C 2201/20* (2013.01); *B09B 2101/16* (2022.01); *C22B 7/00* (2013.01)

(56) References Cited

U.S. PATENT DOCUMENTS

2019/0386354 A1*  12/2019  Muraoka ............... H01M 10/54
2021/0210807 A1*  7/2021   Nishikawa ............. B02C 23/14

FOREIGN PATENT DOCUMENTS

| JP | 2017-004920 A | 1/2017 |
| JP | 2018-078024 A | 5/2017 |
| JP | 2017-174517   | 9/2017 |
| JP | 6268130       | 1/2018 |
| JP | 6378502       | 8/2018 |

OTHER PUBLICATIONS

Extended European Search Report in counterpart European patent application No. 21751310.0, dated Feb. 16, 2024.
International Search Report issued in International Patent Application No. PCT/JP2021/003280, issued Mar. 23, 2021, along with an English translation thereof.
Written Opinion of the International Searching Authority issued in International Patent Application No. PCT/JP2021/003280, issued Mar. 23, 2021, along with an English translation thereof.
Notice of Reasons for Refusal (Office Action) in Japanese Counterpart Patent Appl. No. 2020-018752, issued Mar. 23, 2021, along with an English translation thereof.

* cited by examiner

SEPARATION METHOD FOR VALUABLE RESOURCES

TECHNICAL FIELD

The present invention relates to a sorting method for valuable resources.

BACKGROUND ART

Lithium ion secondary batteries have a lighter weight, a higher capacity, and a higher electromotive force than those of existing lead-acid batteries and NiCd secondary batteries, and are used in, for example, personal computers, electric vehicles, and portable devices.

Lithium ion secondary batteries are expected to be in an increasing use both currently and in the future. Therefore, in terms of resource recycling, it is desirable to recover valuable resources such as aluminum and copper from defective products generated in the production process or lithium ion secondary batteries discarded due to, for example, expired life of the devices in use and batteries. When recovering valuable resources such as aluminum and copper from lithium ion secondary batteries, it is important to recover various metals and impurities used in the lithium ion secondary batteries by separating and sorting them, in order to increase the value of the recovered products.

A technique proposed as a technique for recovering valuable resources from lithium ion secondary batteries heats, pulverizes, and sieves lithium ion secondary batteries, and sorts the obtained pulverized products by shape using an airflow, to thereby recover a heavy product (aluminum) and a light product (copper) separately (for example, see PTL 1).

Another technique proposed as a technique for recovering valuable resources from lithium ion secondary batteries heats waste lithium ion secondary batteries placed on a net to thereby melt and recover aluminum members included in the waste lithium ion secondary batteries, and subsequently pulverizes and recovers unmelted parts (for example, see PTL 2).

However, existing techniques such as those described above have a problem that, for example, the grade and the recovery rate of valuable resources sorted and recovered from lithium ion secondary batteries are not sufficient.

CITATION LIST

Patent Literature

PTL 1: Japanese Patent (JP-B) No. 6378502
PTL 2: JP-B No. 6268130

SUMMARY OF INVENTION

Technical Problem

The present invention aims for solving the various problems in the related art described above and achieving an object described below. That is, the present invention has an object to provide a sorting method for valuable resources, the method being able to sort valuable resources in a manner that respective kinds of valuable resources can be recovered with a high grade at a high recovery rate from a target containing a plurality of kinds of valuable resources.

Solution to Problem

Means for solving the above problems are as follows.

<1.> A sorting method for valuable resources, the sorting method including:
  a thermal treatment step of thermally treating a target containing valuable resources, to melt aluminum and separate a melt;
  a pulverizing step of pulverizing a thermally treated product remaining after the melt is separated, to obtain a pulverized product;
  a magnetic sorting step of sorting the valuable resources from the pulverized product by a magnetic force; and
  a wind force sorting step of sorting one valuable resource from another valuable resource in the valuable resources by a wind force.

<2> The sorting method for valuable resources according to <1>,
  wherein the target is a lithium ion secondary battery.

<3> The sorting method for valuable resources according to <2>,
  wherein the lithium ion secondary battery includes a housing containing aluminum.

<4> The sorting method for valuable resources according to any one of <1> to <3>,
  wherein the valuable resources subjected to the wind force sorting step are non-magnetically attractable materials obtained in the magnetic sorting step.

<5> The sorting method for valuable resources according to any one of <1> to <4>,
  wherein the one valuable resource is aluminum, and the another valuable resource is copper.

<6> The sorting method for valuable resources according to any one of <1> to <5>,
  wherein the target is thermally treated in the thermal treatment step at 660° C. or higher and lower than 1,085° C.

<7> The sorting method for valuable resources according to any one of <1> to <6>, further including after the pulverizing step,
  a classifying step of sieving the pulverized product, to classify the pulverized product into an oversize product and an undersize product,
  wherein after the classifying step, the oversize product is subjected to the magnetic sorting step.

<8> The sorting method for valuable resources according to <7>,
  wherein in the classifying step, sieving is performed with a sieve having a mesh size of 0.6 mm or greater and 2.4 mm or less.

<9> The sorting method for valuable resources according to any one of <1> to <8>,
  wherein in the wind force sorting step, the valuable resources are let to fall, and
  when the valuable resources are let to fall, the valuable resources are sorted by being blown with a wind in a direction intersecting a falling direction of the valuable resources.

Advantageous Effects of Invention

The present invention can solve the various problems in the related art and provide a sorting method for valuable resources, the method being able to sort valuable resources in a manner that respective kinds of valuable resources can be recovered with a high grade at a high recovery rate from a target containing a plurality of kinds of valuable resources.

Figure 1:
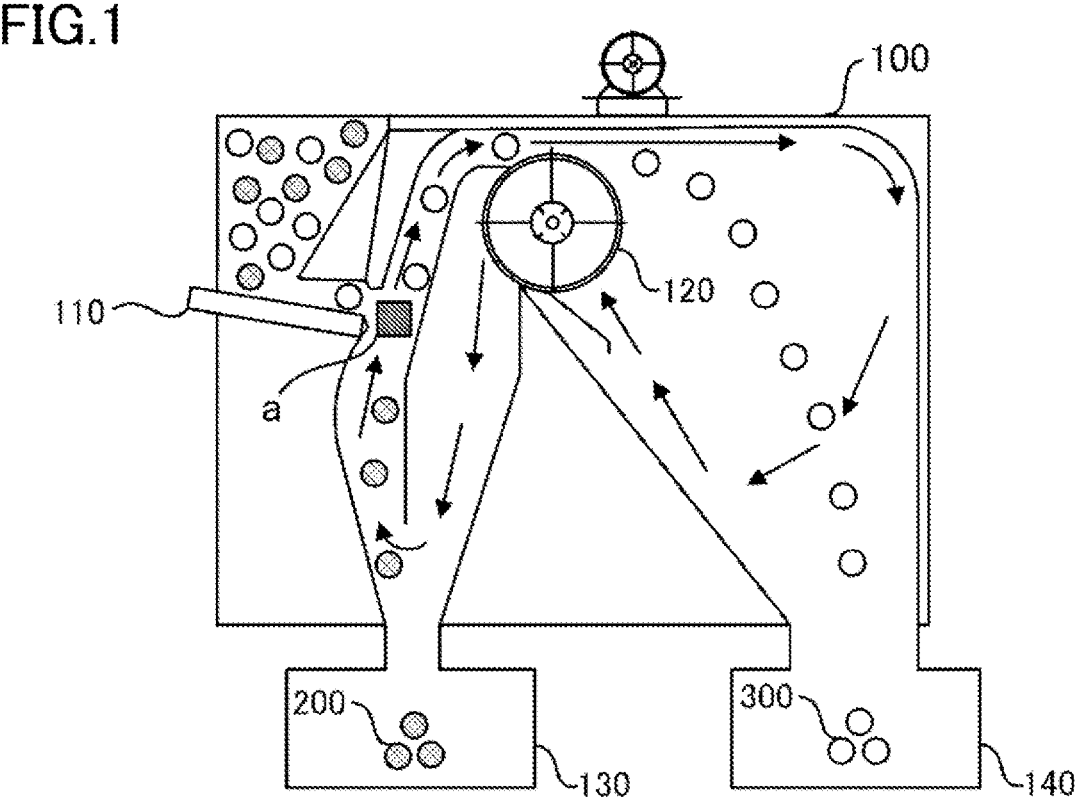
FIG. 1 is a schematic side view illustrating an example of how a wind sorting step is performed using a closed wind sorter.

DESCRIPTION OF EMBODIMENTS (Sorting Method for Valuable Resources)

A sorting method for valuable resources of the present invention includes a thermal treatment step, a pulverizing step, a magnetic sorting step, and a wind force sorting step, preferably includes a classifying step, and further includes other steps as needed.

The sorting method for valuable resources of the present invention is based on the present inventors' finding that there are cases where the grade and the recovery rate of each valuable resource are not sufficient when the valuable resources such as aluminum and copper are sorted and recovered separately from a target such as a lithium ion secondary battery (LIB).

More specifically, the present inventors have found that when processing, for example, large-sized LIB packs such as those for vehicles and ESS (Energy Storage System)/UPS (Uninterruptible Power Supply), of which use has become widespread in recent years, the technique according to Examples disclosed in PTL 1 has a problem that dining shape sorting using an airflow and vibration, the airflow for shape sorting may be disturbed and airflow transportation of copper foils, which are a valuable resource to be recovered as a light product, may be inhibited. This problem is due to magnetically attractable materials (for example, iron) and lumps of aluminum that are included in pulverized products of the lithium ion secondary battery packs, derived from exterior members (housings) of the lithium ion secondary battery packs, and have large particle diameters and tend to be recovered as heavy products during shape sorting using the airflow and vibration according to their particle shapes.

As a result of studies into this problem, the present inventors have found that during airflow sorting, if magnetically attractable materials having a high specific gravity and a large particle diameter cause disturbance of the airflow and inhibition of airflow transportation of copper foils, there are cases where the airflow sorting may fail to sufficiently sort (separate) aluminum and copper that should be sorted from each other.

The present inventors have also found a problem that when metals having ductility against pulverization, such as aluminum, are used in the exterior members of lithium ion secondary battery packs, the load on the pulverizer is considerably high.

As a result of studies into this problem, the present inventors have found it necessary to remove melts of the metals having ductility before pulverization.

The aluminum concentrate (mix metal) recovered from heavy products having a size of from 1.0 mm to 10.0 mm, described in PTL 1, contains a large quantity of copper and is not in a condition commercially marketable as a secondary material.

Here, according to the technique disclosed in PTL 1, it is assumed that heavy products obtained by shape sorting using an airflow and vibration may be subjected to magnetic sorting (separation of iron-based metals by a magnetic sorter). However, when heavy products obtained by shape sorting using an airflow and vibration are subjected to magnetic sorting (subjected to magnetic sorting after shape sorting), the above-described problem that disturbance of the airflow and inhibition of airflow transportation of copper foils are caused by magnetically attractable materials having a high specific gravity and a large particle diameter cannot be solved, and aluminum and copper, which are non-magnetically attractable materials, cannot be sufficiently sorted (separated).

In addition, the technique disclosed in PTL 1 is a technique for recovering aluminum and copper from foils of aluminum (aluminum foils) used in the positive electrodes of lithium ion secondary batteries and foils of copper (copper foils) used in the negative electrodes of lithium ion secondary batteries, respectively. Hence, according to the technique disclosed in PTL 1, it is considered difficult to sort and recover valuable resources such as aluminum and copper separately from lithium ion secondary batteries containing a large quantity of aluminum, such as lithium ion secondary batteries including an aluminum housing.

Hence, according to the technique disclosed in PTL 1, the grade and the recovery rate of each valuable resource are not sufficient when the valuable resources such as aluminum and copper are sorted and recovered separately from a target such as a lithium ion secondary battery.

The present inventors have found a problem that the technique disclosed in PTL 2 cannot sort valuable resources (for example, aluminum) that are other than copper and are contained in pulverized products obtained by pulverizing waste lithium ion secondary batteries.

The technique disclosed in PTL 2 heats waste lithium ion secondary batteries placed on a net to melt and recover aluminum members in the waste lithium ion secondary batteries, and subsequently pulverizes and recovers unmelted parts. However, it is known from Examples of PTL 2 that about fourteen percent of aluminum contained in the waste lithium ion secondary batteries before being processed has failed to be recovered and remains in the unmelted parts that are the residue after the aluminum members are melted and recovered, and that a plurality of kinds of valuable resources such as aluminum and copper are mixed in the unmelted parts.

The technique disclosed in PTL 2 is described as sorting the plurality of kinds of valuable resources contained in the unmelted parts by sieving and magnetic sorting. However, it is known from Examples of PTL 2 that valuable resources other than copper cannot be sufficiently sorted. Particularly, it is considered difficult to effectively sort aluminum and copper, which are non-magnetically attractable materials, with the technique disclosed in PTL 2.

Hence, according to the technique disclosed in PTL 2, the grade and the recovery rate of each valuable resource are not sufficient when the valuable resources such as aluminum and copper are sorted and recovered separately from a target such as a lithium ion secondary battery.

As described above, the present inventors have found that the existing techniques have a problem that the grade and the recovery rate of each valuable resource may not be sufficient when the valuable resources such as aluminum and copper are sorted and recovered separately from a target such as a lithium ion secondary battery.

The present inventors have reached the present invention through studies into a sorting method for valuable resources, the method being able to sort valuable resources in a manner that respective kinds of valuable resources can be recovered with a high grade at a high recovery rate from a target containing a plurality of kinds of valuable resources. That is, the present inventors have found it possible to sort valuable resources in a manner that respective kinds of valuable resources can be recovered with a high grade at a high recovery rate from a target containing a plurality of kinds of valuable resources, by a sorting method for valuable resources including: a thermal treatment step of thermally treating a target containing valuable resources, to melt aluminum derived from a housing of a pack or a cell (in the case of a lithium ion secondary battery) and obtain a melt; a pulverizing step of pulverizing a thermally treated product that is the residue after the melt is obtained, to obtain a pulverized product; a magnetic sorting step of sorting the valuable resources from the pulverized product by a magnetic force; and a wind force sorting step of sorting one valuable resource from another valuable resource in the valuable resources by a wind force.

The sorting method for valuable resources of the present invention magnetically sorts a pulverized product obtained by pulverizing a thermally treated product obtained by thermally treating a target containing valuable resources in order to sort valuable resources from the target (magnetic sorting step). In other words, the sorting method for valuable resources of the present invention sorts valuable resources contained in a pulverized product obtained by heating and pulverizing the target, by magnetically sorting the pulverized product.

By magnetically sorting, for example, a pulverized product in the magnetic sorting step, it is possible to sort (separate) the pulverized product into magnetically attractable materials (ferromagnets such as iron, nickel, and cobalt) and non-magnetically attractable materials (paramagnets or diamagnets such as aluminum, manganese, gold, silver, and copper). For example, when a lithium ion secondary battery is selected as a target, it is possible to sort magnetically attractable materials having a high specific gravity and a large particle diameter such as iron contained in the pulverized product from non-magnetically attractable materials containing aluminum and copper, which are valuable resources, contained in the pulverized product in the magnetic sorting step.

Next, the sorting method for valuable resources of the present invention sorts the valuable resources by a wind force in order to sort from each other, one valuable resource and another valuable resource contained in the valuable resources sorted in the magnetic sorting step (wind force sorting step). In other words, the sorting method for valuable resources of the present invention performs the wind force sorting step after the magnetic sorting step to sort from each other, one valuable resource and another valuable resource contained in the valuable resources sorted in the magnetic sorting step.

In this way, the sorting method for valuable resources of the present invention sorts valuable resources from a pulverized product in the magnetic sorting step, and then sorts the valuable resources by a wind force to sort one valuable resource from another valuable resource. Hence, the sorting method for valuable resources of the present invention sorts by a wind force, valuable resources that are sorted out by removing either magnetically attractable materials or non-magnetically attractable materials from the pulverized product in the magnetic sorting step. Therefore, when performing wind force sorting, it is possible to suppress disturbance of an airflow and inhibition of transportation of valuable resources caused by any objects other than the valuable resources.

More specifically, for example, when a lithium ion secondary battery is selected as a target, a pulverized product is sorted into magnetically attractable materials having a high specific gravity and a large particle diameter such as iron and non-magnetically attractable materials containing, for example, aluminum and copper, which are valuable resources, in the magnetic sorting step. In this case, in the wind force sorting step, for example, the non-magnetically attractable materials containing, for example, aluminum and caper, which are valuable resources, are sorted by a wind force.

This makes it possible to remove magnetically attractable materials having a high specific gravity and a large particle diameter such as iron from the pulverized product and selectively subject the non-magnetically attractable materials containing, example, aluminum and copper, which are valuable resources, to wind force sorting. Therefore, it is possible to suppress disturbance of an airflow and inhibition of airflow transportation of valuable resources (for example, copper foils) caused by the magnetically attractable materials having a high specific gravity and a large particle diameter such as iron during wind force sorting. Therefore, for example, when a lithium ion secondary battery is the target, the sorting method for valuable resources of the present invention can improve the sorting accuracy between aluminum and copper, which are examples of valuable resources, and sort aluminum and copper in a manner that they can be recovered with a high grade at a high recovery rate separately.

In the example of the lithium ion secondary battery described above, the non-magnetically attractable materials are subjected to the wind force sorting step. However, the sorting method for valuable resources of the present invention is not limited to this example, and may sort magnetically attractable materials by a wind force when sorting valuable resources contained in the magnetically attractable materials depending on the kind of the target. Also in this case, during wind force sorting, it is possible to remove non-magnetically attractable materials free of valuable resources to be sorted from a pulverized product obtained by heating and pulverizing a target containing valuable resources, and selectively subject the magnetically attractable materials containing valuable resources to wind force sorting. Therefore, it is possible to suppress disturbance of an airflow and inhibition of airflow transportation of valuable resources (for example, copper foils) that may be caused by the non-magnetically attractable materials during wind force sorting, and to improve the sorting accuracy between valuable resources.

Hence, the sorting method for valuable resources of the present invention can improve the sorting accuracy between valuable resources by magnetically sorting a pulverized product to sort out valuable resources from the target and sorting the valuable resources by a wind force to sort one valuable resource and another valuable resource contained in the valuable resources from each other, and can sort the valuable resources in a manner that each valuable resource can be recovered with a high grade at a high recovery rate. That is, by performing the thermal treatment step, the pulverizing step, the magnetic sorting step, and the wind force sorting step, the sorting method for valuable resources of the present invention can sort valuable resources in a manner that each valuable resource can be recovered with a high grade at a high recovery rate from a target containing a plurality of kinds of valuable resources.

<Thermal Treatment Step>

The thermal treatment step is a step of thermally treating a target containing valuable resources, to melt aluminum and separate a melt in other words, the thermal treatment step is a step of thermally treating a target containing valuable resources, to separate an aluminum melt and obtain a thermally treated product that remains after the melt is separated.

The thermal treatment method in the thermal treatment step is not particularly limited and may be appropriately selected in accordance with the intended purpose. For example, it is possible to thermally treat the target by heating the target in a known roasting furnace.

The roasting furnace is not particularly limited and may be appropriately selected in accordance with the intended purpose. Examples of the roasting furnace include batch-type furnaces such as a rotary kiln, a fluidized bed furnace, a tunnel furnace, and a muffle, a cupola, and a stoker furnace.

The atmosphere used in the thermal treatment is not particularly limited and may be appropriately selected in accordance with the intended purpose. Examples of the atmosphere include an atmospheric atmosphere, an oxidizing atmosphere, an inert atmosphere, a reducing atmosphere, and a hypoxic atmosphere.

The atmospheric atmosphere (air atmosphere) represents an atmosphere using open air (air) in which oxygen accounts for 21% by volume and nitrogen accounts for 78% by volume.

The oxidizing atmosphere represents an atmosphere in which an inert atmosphere such as nitrogen or argon contains oxygen by 1% by mass or greater and 21% by mass or less. An atmosphere containing oxygen by 1% by mass or greater and 5% by mass or less is preferable.

The inert atmosphere represents an atmosphere formed of nitrogen or argon.

The reducing atmosphere represents an atmosphere in which an inert atmosphere such as nitrogen or argon contains, for example, $CO$, $H_2$, $H_2S$, and $SO_2$.

The hypoxic atmosphere represents an atmosphere in which an oxygen partial pressure is 5% or lower.

<<Target/Valuable Resources/Thermally Treated Product>>

The target is not particularly limited and may be appropriately selected in accordance with the intended purpose so long as the target contains valuable resources and can be pulverized at least after thermal treatment.

The valuable resources represent materials that can suffice as marketing targets without being discarded. Examples of the valuable resources include various metals.

The thermally treated product represents a product obtained by thermally treating the target.

Examples of the target include lithium ion secondary batteries, used lithium ion secondary batteries, and scraps of positive electrode materials and negative electrode materials that are generated during production of lithium ion secondary batteries. The sorting method for valuable resources of the present invention can be particularly suitably used when the target is a lithium ion secondary battery. In other words, in the sorting method for valuable resources of the present invention, it is preferable that the target be a lithium ion secondary battery When the target is a lithium ion secondary battery, preferable examples of the valuable resources include aluminum and copper.

—Lithium Ion Secondary Battery—

In the present invention, the lithium ion secondary battery that can be selected as the target is not particularly limited and may be appropriately selected in accordance with the intended purpose. Examples of such a lithium ion secondary battery include defective lithium ion secondary batteries generated in the production process of lithium ion secondary batteries, lithium ion secondary batteries discarded due to, for example, defects of devices in use and expired life of devices in use, and used lithium ion secondary batteries discarded due to expired life.

The shape, structure, size, and material of the lithium ion secondary battery are not particularly limited and may be appropriately selected in accordance with the intended purpose.

The shape of the lithium ion secondary battery is not particularly limited and may be appropriately selected in accordance with the intended purpose. Examples of the shape of the lithium ion secondary battery include a laminate shape, a cylindrical shape, a button shape, a coin shape, a square shape, and a flat shape.

The form of the lithium ion secondary battery is not particularly limited and may be appropriately selected in accordance with the intended purpose. Examples of the form of the lithium ion secondary battery include a battery cell, a battery module, and a battery pack. A battery module represents a product including a plurality of battery cells, which are unit cells, in one housing in a connected state. A battery pack represents a product including a plurality of battery modules in one housing. A battery pack may be equipped with, for example, a controller and a cooling device.

Examples of a lithium ion secondary battery include a lithium ion secondary battery including, for example, a positive electrode, a negative electrode, a separator, an electrolytic solution containing an electrolyte and an organic solvent, and an exterior container, which is a battery case containing the positive electrode, the negative electrode, the separator, and the electrolytic solution. A lithium ion secondary battery from which, for example, a positive electrode or a negative electrode is lost may also be used.

—Positive Electrode—

The positive electrode is not particularly limited and may be appropriately selected in accordance with the intended purpose so long as the positive electrode includes a positive electrode current collector.

The shape of the positive electrode is not particularly limited and may be appropriately selected in accordance with the intended purpose. Examples of the shape of the positive electrode include a flat plate shape and a sheet shape.

—Positive Electrode Current Collector—

The shape, structure, size, and material of the positive electrode current collector are not particularly limited and may be appropriately selected in accordance with the intended purpose.

Examples of the shape of the positive electrode current collector include a foil shape.

Examples of the material of the positive electrode current collector include stainless steel, nickel, aluminum, copper, titanium, and tantalum. Among these materials, aluminum is preferable.

It is preferable that the lithium ion secondary battery include a positive electrode material on the positive electrode current collector.

The positive electrode material is not particularly limited and may be appropriately selected in accordance with the intended purpose. Examples of the positive electrode material include a positive electrode material that contains at least a positive electrode active substance containing a rare valuable resource, and that contains a conducting agent and a binder resin as needed.

The rare valuable resource is not particularly limited and may be appropriately selected in accordance with the intended purpose. At least one of manganese, cobalt, and nickel is preferable.

Examples of the positive electrode active substance include lithium manganate ($LiMn_2O_4$), lithium cobaltate ($LiCoO_2$), lithium cobalt-nickelate ($LiCo_{1/2}Ni_{1/2}O_2$), a NCM-based positive electrode material ($LiNi_xCo_yMn_zO_2$ ($x+y+z=1$)), and a NCA-based positive electrode material (nickel, cobalt, or aluminum-based).

The conducting agent is not particularly limited and may be appropriately selected in accordance with the intended purpose. Examples of the conducting agent include carbon black, graphite, carbon fiber, and metal carbides.

The binder resin is not particularly limited and may be appropriately selected in accordance with the intended purpose. Examples of the binder resin include homopolymers or copolymers of, for example, vinylidene fluoride, tetrafluoroethylene, acrylonitrile, and ethylene oxide, and styrene-butadiene rubbers.

——Negative Electrode——

The negative electrode is not particularly limited and may be appropriately selected in accordance with the intended purpose so long as the negative electrode includes a negative electrode current collector.

The shape of the negative electrode is not particularly limited and may be appropriately selected in accordance with the intended purpose. Examples of the Shape of the negative electrode include a flat plate shape and a sheet shape.

——Negative Electrode Current Collector——

The shape, structure, size, and material of the negative electrode current collector are not particularly limited and may be appropriately selected in accordance with the intended purpose.

Examples of the shape of the negative electrode current collector include a foil shape.

Examples of the material of the negative electrode current collector include stainless steel, nickel aluminum, copper, titanium, and tantalum. Among these materials, copper is preferable.

It is preferable that the lithium ion secondary battery include a negative electrode material on the negative electrode current collector.

The negative electrode material is not particularly limited and may be appropriately selected in accordance with the intended purpose. Examples of the negative electrode material include carbon materials such as graphite and bard carbon, and titanate.

The material of the exterior container (housing) of the lithium ion secondary battery is not particularly limited and may be appropriately selected in accordance with the intended purpose. Examples of the material of the exterior container include aluminum and resins (plastics).

In the present invention, for example, also when a lithium ion secondary battery containing a large quantity of aluminum, such as a lithium ion secondary battery including an aluminum housing, is the target, it is possible to sort aluminum, which is an example of a valuable resource, and another valuable resource from each other highly accurately and highly efficiently. In other words, it is suitable to use the sorting method for valuable resources of the present invention when sorting valuable resources from lithium ion secondary batteries including a housing containing aluminum.

<<Thermal Treatment Conditions>>

The conditions (thermal treatment conditions) for thermally treating (heating) the target are not particularly limited and may be appropriately selected in accordance with the intended purpose, so long as the conditions enable the respective constituent components of the target to be pulverized separately in the pulverizing step described below.

Examples of the thermal treatment conditions include a thermal treatment temperature and a thermal treatment time.

The thermal treatment temperature represents a temperature of the target (for example, a lithium ion secondary battery) during the thermal treatment. It is possible to measure the thermal treatment temperature by inserting a thermometer such as a thermocouple or a thermistor into the target at the thermal treatment temperature.

The thermal treatment temperature can be appropriately selected depending on the target.

When the target is a lithium ion secondary battery, the thermal treatment temperature is preferably higher than or equal to the melting point of the housing (exterior container) of the lithium ion secondary battery. At such a temperature, when the housing of the lithium ion secondary battery is formed of a metal, the housing can be melted in the thermal treatment step, and, for example, it is easy to recover the metal derived from the housing and, for example, the electrodes of the lithium ion secondary battery separately by disposing a receptacle for recovering the melted metal of the housing under the lithium ion secondary battery.

More specifically, for example, when the housing of a lithium ion secondary battery contains aluminum, it is preferable to set the thermal treatment temperature to higher than or equal to 660° C., which is the melting point of aluminum. This makes it possible to melt and recover aluminum contained in the housing of the lithium ion secondary battery in the thermal treatment step. That is, when a lithium ion secondary battery including a housing containing aluminum is the target, the sorting method for valuable resources of the present invention can easily recover aluminum derived from the housing by easily sorting (separating) aluminum contained in the housing and other parts (for example, electrodes) of the lithium ion secondary battery from each other by thermally treating the lithium ion secondary battery at higher than or equal to 660° C. in the thermal treatment step.

When a lithium ion secondary battery including a housing containing aluminum is the target, the sorting method for valuable resources of the present invention can reduce the amount of aluminum that may be recovered as heavy products in the wind force sorting step described below and can better improve the sorting accuracy between valuable resources (in this case, aluminum and copper) because aluminum in the lithium ion secondary battery is mostly recovered through separation and recovery of aluminum derived from the housing in the thermal treatment step. Particularly, when the amount of aluminum to be recovered as heavy products in the wind force sorting is high, disturbance of an airflow and inhibition of airflow transportation of copper foils are caused, and aluminum and copper that should be sorted from each other cannot be sorted (separated) sufficiently.

In the sorting method for valuable resources of the present invention, it is preferable to perform thermal treatment at a thermal treatment temperature that is higher than or equal to the melting point of the positive electrode current collector but lower than or equal to the melting point of the negative electrode current collector in the thermal treatment step.

In this case, for example, when the positive electrode current collector is aluminum (melting point: 660° C.) and the negative electrode current collector is copper (melting point: 1,085° C.), the positive electrode current collector formed of an aluminum foil is melted and embrittled, and can be easily grained in the pulverizing step described below. On the other hand, the negative electrode current collector formed of a copper foil is thermally treated at a temperature lower than the melting point of copper and remains unmelted. Therefore, copper in the pulverized product obtained by pulverizing the thermally treated product obtained in the thermal treatment step in the pulverizing step exists in a shape close to a foil even after the pulverization, and can be sorted out as a light product more effectively at a high level in the wind force sorting step described below.

That is, for example, when the target is a lithium ion secondary battery in the sorting method for valuable resources of the present invention, the thermal treatment temperature is preferably 500° C. or higher and 1,200° C. or lower, more preferably 660° C. or higher and lower than 1,085° C., and particularly preferably 660° C. or higher and 850° C. or lower.

For example, when a lithium ion secondary battery including a housing containing aluminum is the target, the thermal treatment temperature of 660° C. (melting point of aluminum) or higher and lower than 1,085° C. (melting point of copper) described above makes it possible to separate and recover aluminum derived from the housing and maintain copper contained in the negative electrode current collector in a shape close to a foil without being melted. This better improves the sorting accuracy between valuable resources (in this case, aluminum and copper) in the wind force sorting step.

Moreover, at the thermal treatment temperature of 660° C. or higher and 850° C. or lower, the sorting method for valuable resources of the present invention can melt and separate aluminum while preventing embrittlement of metals other than aluminum.

The thermal treatment time (a time for which the target is thermally treated) is not particularly limited, mays be appropriately selected in accordance with. the intended purpose, and is preferably, for example, 1 minute or longer and 5 hours or shorter, more preferably 1 minute or longer and 2 hours or shorter, and particularly preferably 1 minute or longer and 1 hour or shorter. The thermal treatment time may be for example, a time taken until the target reaches the thermal treatment temperature described above, and the retention time may be short. When the thermal treatment time is 1 minute or longer and 5 hours or shorter, there are advantages that the costs taken for thermal treatment can be saved, and the thermal treatment efficiency can be improved.

<Pulverizing Step>

The pulverizing step is a step of pulverizing a thermally treated product to obtain a pulverized product. In other words, the pulverizing step is a step of pulverizing a thermally threated product that remains after the melt is separated, to obtain a pulverized product.

The pulverizing step is not particularly limited and may be appropriately selected in accordance with the intended purpose so long as the pulverizing step is a step of pulverizing a thermally treated product (roasted product) to obtain a pulverized product. The pulverized product represents a product obtained by pulverizing a thermally treated product.

The pulverizing step is preferably a step of pulverizing a thermally treated product by, for example, an impact, to obtain a pulverized product. For example, when a lithium ion secondary battery is selected as the target, it is more preferable to perform a preparatory pulverization, in which a thermally treated product, is cut with a cutting device, before applying an impact to the thermally treated product, when there is a condition of not melting the housing of the lithium ion secondary battery in the thermal treatment step.

Examples of the pulverization method by an impact include a method of throwing the thermally treated product using a rotating beating board and slamming the thermally treated product against an impact board to apply an impact, and a method of beating the thermally treated product using a rotating beater. The method can be performed with, for example, a hammer crusher. The pulverization method by an impact may be a method of beating the thermally treated product using a ball formed of, for example, ceramic. This method can be performed with a ball mill. Pulverization by an impact can also be performed with, for example, a biaxial crusher configured to perform pulverization by compression and having a short width of cut and a short blade length.

Examples of the pulverization method by an impact also include a method of beating the thermally treated product with two rotating chains to apply an impact. This method can be performed with a chain mill.

The pulverization time in the pulverizing step is not particularly limited and may be appropriately selected in accordance with the intended purpose. For example, when the target is a lithium ion secondary battery, the pulverization time per 1 kg of the lithium ion secondary battery is preferably 1 second or longer and 30 minutes or shorter, more preferably 2 seconds or longer and 10 minutes or shorter, and particularly preferably 3 seconds or longer and 5 minutes or shorter.

The pulverization conditions in the pulverizing step are as follows. For example, for pulverization using an impact type or beating type pulverizer such as a chain mill or a hammer mill, it is preferable to set the tip speed of the chain or the hammer to 10 m/sec or higher and 300 m/sec or lower, and to set the residence time of the target in the pulverizer to 1 second or longer and 10 minutes or shorter. In the sorting method for valuable resources of the present invention, these conditions make it possible to pulverize copper and aluminum, which are positive electrode materials, and members formed of Fe derived from the housing without excessively minutely pulverizing them.

<Classifying Step>

It is preferable that the sorting method for valuable resources of the present invention include a classifying step of sieving the pulverized product, to classify the pulverized product into an oversize product and an undersize product, after the pulverizing step.

The classifying step is not particularly limited and may be appropriately selected in accordance with the intended purpose so long as the classifying step is a step through which the pulverized product can be sieved and classified into an oversize product and an undersize product. It is more preferable to include a step of magnetically sorting the respective products separated by sieving. In the following description, the product separated above the sieve may be referred to as an oversize product (coarse grain product), and the product separated. below the sieve may be referred to as an undersize product (fine grain product).

Sieving can be performed using, for example, a vibrating sieve, a multi-stage vibrating sieve, a cyclone, and a JIS Z8801 standard sieve.

The mesh size (sieve mesh) of the sieve is not particularly limited, may be appropriately selected in accordance with the intended purpose, and is preferably 0.2 mm or greater and 4.8 mm or less, more preferably 0.3 mm or greater and 2.4 mm or less, and particularly preferably about 1.2 mm.

For example, when a lithium ion secondary battery is selected as the target, the lithium ion secondary battery is sieved through a sieve having a mesh size of 0.6 mm or greater and 2.4 mm or less, and the oversize product (coarse grain product) is magnetically sorted. This makes it possible to better improve the sorting accuracy of copper in the wind force sorting step and better improve the recovery rate of copper.

Sieving (classification) into an oversize product (coarse grain product) and an undersize product (fine grain product) may be repeated a plurality of times. This another sieving can even more reduce the impurity grade of each product.

<Magnetic Sorting Step>

The magnetic sorting step is a step of magnetically sorting the pulverized product (or sorting out valuable resources magnetically) in order to sort valuable resources from the target. In other words, in the magnetic sorting step, the pulverized product is magnetically sorted, in order to sort out valuable resources from the target (or from the pulverized product obtained by thermally treating and pulverizing the target). In the following description, magnetic sorting may be referred to as "magnetic force sorting" or "magnetic separation".

Valuable resources sorted in the magnetic sorting step need to contain at least two kinds of valuable resources, may contain three or more kinds of valuable resources, and may contain components other than valuable resources. That is, when sorting out valuable resources in the magnetic sorting step, it is only necessary to be able to sort the pulverized product into what is to be subjected to wind force sorting and what is not to be subjected to wind force sorting by sorting out at least a matter containing valuable resources from the pulverized product.

The magnetic sorting step can be performed using, for example, a known magnetic sorter (magnetic separator).

The magnetic sorter that can be used in the present invention is not particularly limited and may be appropriately selected in accordance with the intended purpose. Examples of the magnetic sorter include a bar magnet, a lattice magnet, a rotary magnet, a magnet strainer, a high magnetic force pulley (magnet pulley) magnetic sorter, a drum-shaped magnetic sorter, and a suspended magnetic sorter. Among these magnetic sorters, it is preferable to use a drum-shaped magnetic sorter and a suspended magnetic sorter in the present invention.

In the magnetic sorting step, for example, sorting is performed with a magnetic force that can sort a magnetically attractable material and a non-magnetically attractable material contained in the target from each other depending on the kind of the target (the kinds of valuable resources contained in the target).

A magnetically attractable material represents a material that can be attracted to a magnetic force source by an attractive force generated between the material and the magnetic force source by a magnetic force generated by the magnetic force source configured to generate a magnetic force (a magnetic field) (for example, a magnet and an electromagnet). Examples of the magnetically attractable material include ferromagnetic metals. Examples of ferromagnetic metals include iron, nickel, and cobalt.

A non-magnetically attractable material represents a material that is not attracted to the magnetic force source by a magnetic force generated by the magnetic force source. The non-magnetically attractable material is not particularly limited and may be appropriately selected in accordance with the intended purpose. Examples of non-magnetically attractable metal materials include paramagnetic or diamagnetic metals. Examples of paramagnetic or diamagnetic metals include aluminum, manganese, gold, silver, and copper.

For example, when a lithium ion secondary battery is selected as the target, magnetically attractable materials having a high specific gravity and a large particle diameter such as iron contained in the pulverized product and non-magnetically attractable materials containing, for example, aluminum and copper, which are valuable resources, contained in the pulverized product can be sorted from each other in the magnetic sorting step.

In the above example in which a lithium ion secondary battery is the target, a case where valuable resources to be sorted are contained in non-magnetically attractable materials is described. The present invention is not limited to this example. For example, depending on the kind of the target, valuable resources to be sorted may be contained in magnetically attractable materials.

When the sorting method for valuable resources of the present invention includes the classifying step described above, it is preferable to magnetically sort an oversize product out of the oversize product and an undersize product classified in the classifying step, to sort valuable resources from the oversize product in the magnetic sorting step. In other words, it is preferable that the sorting method for valuable resources of the present invention further include, after the pulverizing step, the classifying step of sieving the pulverized product to classify the pulverized product into an oversize product and an undersize product, and subject the oversize product to the magnetic sorting step after the classifying step.

In this way, the sorting method for valuable resources of the present invention can magnetically sort a pulverized product having a diameter greater than or equal to a predetermined size selectively. This makes it possible to subject valuable resources having a diameter greater than or equal to the predetermined size to wind force sorting, and to better improve the wind force sorting accuracy.

The magnetic force in the magnetic sorting step may be appropriately selected depending on the sorting target. For example, when sorting iron, the magnetic force is preferably 0.01 T (tesla) or higher and 0.3 T or lower. When sorting stainless steel, a magnetic force higher than the range described above may be used. Different magnetic forces may be combined and used in multiple stages.

In this way, the sorting method for valuable resources of the present invention can selectively recover magnetically attractable materials such as iron and stainless steel.

<Wind Force Sorting Step>

The wind force sorting step is a step of sorting one valuable resource from another valuable resource in the valuable resources sorted in the magnetic sorting step by a wind force. For example, non-magnetically attractable materials containing a plurality of kinds of valuable resources, sorted in the magnetic sorting step, are subjected to the wind force sorting step, and one valuable resource and another valuable resource contained in the valuable resources are sorted from each other by a wind force. In the following description, sorting by a wind force may be referred to as "wind force sorting".

One valuable resource sorted in the wind force sorting step needs only to contain at least the one valuable resource, and may contain any other component than the one valuable resource. Likewise, another valuable resource sorted in the wind force sorting step needs only to contain at least the another valuable resource, and may contain any component other than the another valuable resource. That is, when sorting one valuable resource and another valuable resource contained in the valuable resources sorted in the magnetic sorting step in the wind force sorting step, it is only necessary to be able to sort the valuable resources into a matter containing one valuable resource and a matter containing another valuable resource.

For example, the grade of the one valuable resource in the one valuable resource sorted in the wind force sorting step is preferably 80% by mass or greater and more preferably 99% by mass or greater. For example, when the grade of the one valuable resource is 99% by mass or greater, the sorted one valuable resource can be sold at a higher price. For example, the grade of the another valuable resource in the another valuable resource sorted in the wind force sorting step is preferably 95% by mass or greater.

The method for performing the wind force sorting step is not particularly limited and may be appropriately selected in accordance with the intended purpose so long as the method can sort one valuable resource and another valuable resource by a wind force.

In the wind force sorting step, for example, the valuable resources sorted in the magnetic sorting step are let to fall. When letting the valuable resources fall, it is preferable to blow the valuable resources with a wind in a direction. intersecting the falling direction of the valuable resources, to thereby sort one valuable resource from another valuable resource. In other words, in the sorting method for valuable resources of the present invention, it is preferable to perform sorting in the wind force sorting step by letting the valuable resources fall, and when letting the valuable resource fall, by blowing the valuable resources with a wind in a direction intersecting the falling direction of the valuable resource.

This makes it possible to sort one valuable resource and another valuable resource from each other at a high accuracy utilizing the differences in specific gravity and shape between the one valuable resource and the another valuable resource.

More specifically, when sorting the valuable resources by blowing the valuable resources with a wind in a direction intersecting the falling direction of the valuable resources, it is preferable to let the wind blow up in a direction approximately opposite to the falling direction of the valuable resources when letting the valuable resources fall, to bring the wind into contact with the valuable resources and let one valuable resource contained in the valuable resources fall to be sorted (recovered) and let another valuable resource contained in the valuable resources be transported by the wind to be sorted (recovered).

The angle (intersecting angle) between the falling direction of the valuable resources and the wind blowing direction (wind travelling direction) is not particularly limited and may be appropriately selected in accordance with the intended purpose so long as the falling direction of the valuable resources and the wind blowing direction intersect each other. By setting a large intersecting angle, it is advantageously possible to obtain a large angle between the travelling directions of the one valuable resource and the another valuable resource after being blown with the wind, and sort them efficiently. More specifically, the intersecting angle is preferably greater than 0° but 180° or less, more preferably 70° or greater and 180° or less, yet more preferably 90° or greater and 180° or less, and particularly preferably 135° or greater and 180° or less.

When sorting the valuable resources by blowing the valuable resources with a wind in a direction intersecting the falling direction of the valuable resources, the conditions such as the wind speed of the wind may be appropriately set depending on the kinds of the valuable resources in a manner that one valuable resource and another valuable resource can be sorted from each other.

When sorting one valuable resource and another valuable resource by blowing the valuable resources with a wind in a direction intersecting the falling direction of the valuable resources, for example, a known wind sorter may be used.

The wind sorter is not particularly limited and may be appropriately selected in accordance with the intended purpose. Examples of the wind sorter include a closed wind sorter. It is optional to appropriately install a diffuser in order to control, for example, the shape of the blowing wind.

FIG. 1 is a schematic side view illustrating an example of how the wind force sorting step is performed with a closed wind sorter.

A closed wind sorter 100 illustrated in FIG. 1 is configured to sort and recover a heavy product 200 and a light product 300, which are the valuable resources, into a heavy product container 130 and a light product container 140 respectively. The arrows in FIG. 1 indicate the direction of the wind generated by rotation of a sirocco fan 120 in the closed wind sorter 100.

When sorting and recovering the heavy product 200 and the light product 300, which are the valuable resources, a feeder 110 is used to let the heavy product 200 and the light product 300 fall in the downward direction of FIG. 1. Here, at a position a from which the heavy product 200 and the light product 300 are let to fall, a wind contacts the heavy product 200 and the light product 300 from a direction approximately opposite to the falling direction of the heavy product 200 and the light product 300. That is, the example illustrated in FIG. 1 is an example in Which the intersecting angle is approximately 180°.

Hence, by appropriately setting conditions such as the wind speed at the position a from which the heavy product 200 and the light product 300 are let to fall, it is possible to let the heavy product 200 fall and sort and recover the heavy product 200 into the heavy product container 130 and transport the light product 300 by the wind and sort and recover the light product 300 into the light product container 140, utilizing the differences in specific gravity and shape between the heavy product 200 and the light product 300. That is, in the closed wind sorter 100, the heavy product 200 that is not readily affected by the wind falls and is recovered into the heavy product container 130, and the light product 300 that is readily affected by the wind is transported by the wind and recovered into the light product container 140. Hence, the valuable resources can be sorted into the heavy product (one valuable resource) 200 and the light product (another valuable resource) 300.

In the sorting method for valuable resources of the present invention, the wind force sorting step is not limited to being performed with a wind sorter, but may be performed with, for example, an air table.

An air table represents a device configured to sort the sorting targets using an airflow (wind force) and a table and utilizing the differences in resistance to the airflow and frictional force on the table between the sorting targets due to the differences in specific gravity and shape between the sorting targets.

Examples of the wind force sorting target in the valuable resources obtained from a lithium ion secondary battery include non-magnetically attractable materials sorted in the magnetic sorting step. Aluminum is preferable as one valuable resource, and copper is preferable as another valuable resource. In other words, in the sorting method for valuable resources of the present invention, it is preferable that one valuable resource be aluminum and another valuable resource be copper.

In this case, when a lithium ion secondary battery is thermally treated at higher than or equal to the melting point of aluminum but lower than the melting point of copper (at 600° C. or higher and lower than 1085° C.), it is considered that aluminum contained in the lithium ion secondary battery melts and becomes a lump shape, and that copper contained in the negative electrode current collector does not melt but has a shape close to a foil.

Here, of aluminum and caper, aluminum has the lower specific gravity. However, in the example described above, aluminum has a lump shape and is not readily affected by a wind (airflow), whereas copper has a shape close to a foil and is readily affected by a wind (airflow). Hence, in this example, lump-shaped aluminum is not appreciably affected by a wind and is sorted (recovered) as a heavy product, and foil-shaped copper is transported by a wind and sorted (recovered) as a light product.

In this way, in the wind force sorting step, sorting is performed utilizing not only the difference in specific gravity between one valuable resource and another valuable resource contained in the valuable resources, but also the difference in shape between them.

<Other Steps>

The other steps are not particularly limited and may be appropriately selected in accordance with the intended purpose.

Example of Embodiment

Figure 2:
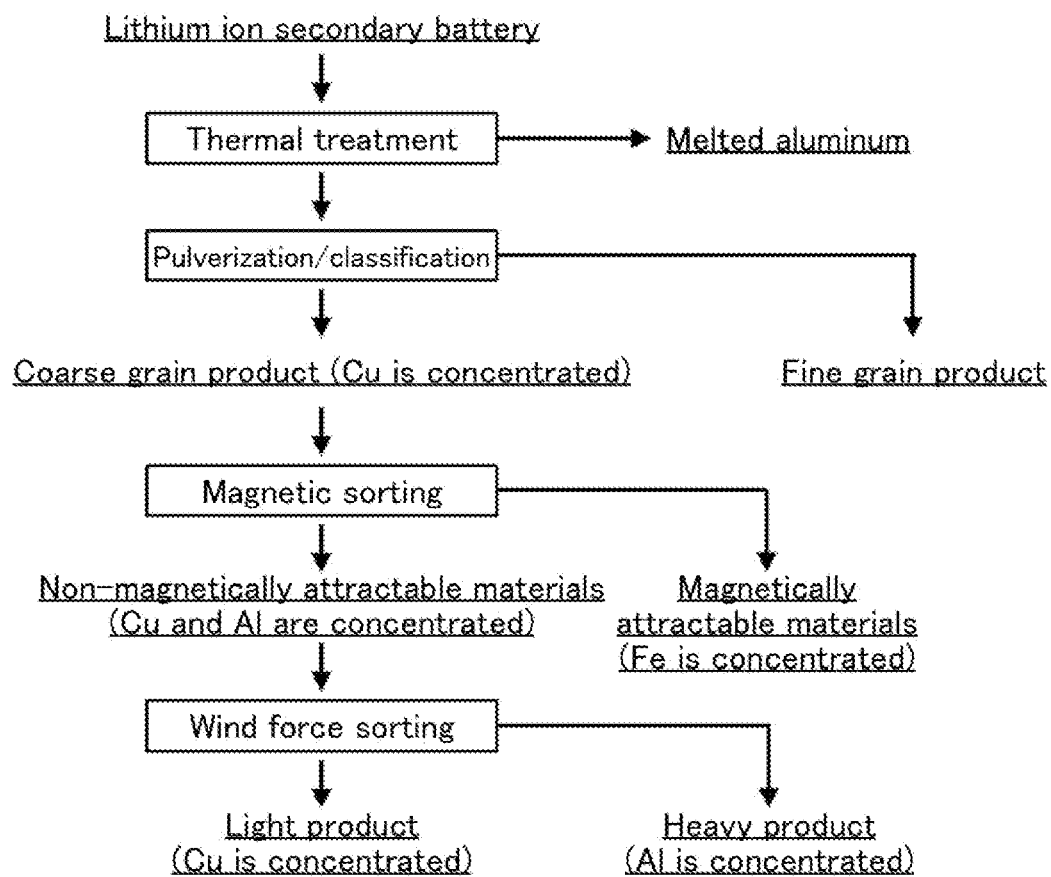
FIG. 2 is a diagram illustrating an example of a flow of a process in an embodiment of a sorting method for valuable resources of the present invention.

An example of an embodiment of the sorting method for a lithium ion secondary battery of the present invention will be described with reference to the drawing. FIG. 2 is a diagram illustrating an example of a flow of a process in an embodiment of the sorting method for valuable resources of the present invention. FIG. 2 illustrates an example in which a lithium ion secondary battery is selected as the target.

As illustrated in FIG. 2, in the present embodiment, first, a lithium ion secondary battery is thermally treated, to obtain a thermally treated product of the lithium ion secondary battery. Here, the lithium ion secondary battery is thermally treated at higher than or equal to the melting point of aluminum but lower than the melting point of copper (at 600° C. or higher and lower than 1,085°), to melt aluminum contained in the lithium ion secondary battery and sort and recover aluminum (obtain melted aluminum).

Next, after the thermally treated product of the lithium ion secondary battery is pulverized to obtain a pulverized product, the pulverized product is classified into a coarse grain product (oversize product) and a fine grain product (undersize product). Here, copper (Cu) is sorted and concentrated in the coarse grain product (oversize product).

Next, the coarse grain product (oversize product) is magnetically sorted (magnetically separated), to sort the coarse grain product into magnetically attractable materials and non-magnetically attractable materials. Iron (Fe) is sorted and concentrated in the magnetically attractable materials. Copper (Cu) and aluminum (Al), which are valuable resources, are sorted and concentrated in the non-magnetically attractable materials.

Next, the non-magnetically attractable materials containing the valuable resources obtained by magnetic sorting are subjected to sorting by a wind force (wind force sorting), to sort the non-magnetically attractable materials into a heavy product and a light product. Aluminum (Al), which is an example of one valuable resource is sorted and concentrated in the heavy product, and copper (Cu), which is an example of another valuable resource is sorted and concentrated.

In this way, in the present embodiment, it is possible to sort aluminum and copper contained in a lithium ion secondary battery highly accurately and efficiently.

EXAMPLES

The present invention will be described below by way of Examples. The present invention should not be construed as being limited to these Examples.

Example 1

<Thermal Treatment>

Using a batch-type burner furnace obtained from Eco-System Akita Co., Ltd. as a thermal treatment device, a battery pack (about 75 kg) of lithium ion secondary batteries including housings containing aluminum were thermally treated at a thermal treatment temperature of 800° C. (subjected to temperature elevation for 1 hour and subsequently retained for 2 hours), to obtain a thermally treated product. For thermal treatment, the lithium ion secondary batteries were placed on a container and let into the thermal treatment device, to melt and separate aluminum and recover aluminum into the bottom of the container (melting recovery of aluminum was performed).

<Pulverization>

Next, using a hammer crusher (MAKINO-TYPE SWING HAMMER CRUSHER HC-20-3.7, obtained from Makino Mfg. Co., Ltd.) as a pulverizer, the lithium ion secondary batteries having been subjected to the heating treatment were pulverized at 50 Hz (at a hammer circumferential speed of 38 m/s) with grate openings of 300 mm×200 mm in a screen at the outlet, to obtain a pulverized product of the lithium ion secondary batteries.

<Classification>

Successively, using sieve having a mesh size of 1.2 mm (with a diameter of 200 mm, obtained from Tokyo Screen Co., Ltd.), the pulverized product of the lithium ion secondary batteries was sieved and classified. After classification, the oversize product (coarse grain product) and the undersize product (fine grain product) of the sieve were harvested, respectively.

<Magnetic Sorting>

Next, using a dry paramagnetic force drum-shaped magnetic sorter CC15ΦX20W (obtained from Eriez Magnetics Japan Co., Ltd.) as a magnetic sorter, the oversize product (coarse grain product) was magnetically sorted (magnetically separated) into magnetically attractable materials and non-magnetically attractable materials. For performing magnetic sorting, the conditions (for example, magnetic flux density) of the magnetic sorter were set in a manner that iron contained in the oversize product could be sorted as a magnetically attractable material.

<Wind Force Sorting>

Next, using a closed wind sorter (obtained from Matsuoka Engineering Co., Ltd., APS-250-RB) as a wind sorter, the non-magnetically attractable materials sorted by magnetic sorting were sorted by a wind force (wind force sorting) into a heavy product and a light product, which were then recovered. For performing wind force sorting, the conditions of the wind sorter were set in a manner that, of the valuable resources contained in the non-magnetically attractable materials, aluminum could be sorted as a heavy product (one valuable resource) and copper could be sorted as a light product (another valuable resource).

Example 2

The same operations as in Example 1 were performed except that a battery module (about 13 kg) of lithium ion secondary batteries including battery cells including aluminum housings were used as the processing target instead of the battery pack of lithium ion secondary batteries, to thereby sort and recover aluminum as a heavy product (one valuable resource) and copper as a light product (another valuable resource).

Example 3

The same operations as in Example 1 were performed except that five battery cells (about 4 kg) of lithium ion secondary batteries including aluminum housings were used as the processing target instead of the battery pack of lithium ion secondary batteries, to thereby sort and recover aluminum as a heavy product (one valuable resource) and copper as a light product (another valuable resource).

Example 4

The same operations as in Example 1 were performed except that sorting using a dry pocket air table VFNC3S (obtained from J.TEC Ltd.) instead of the wind sorter was performed, to thereby sort and recover aluminum as a heavy product (one valuable resource) and copper as a light product (another valuable resource).

Comparative Example 1

The same operations as in Example 1 were performed except that melting recovery of aluminum was not performed and magnetic sorting was not performed, to thereby sort and recover aluminum as a heavy product (one valuable resource) and copper as a light product (another valuable resource). That is, in the thermal treatment of Comparative Example 1, although aluminum was melted at the same thermal treatment temperature for the same thermal treatment time as in Example 1 with the lithium ion secondary batteries placed on a container and let into a thermal treatment device, the melted aluminum was not separated and recovered into the bottom of the container.

Comparative Example 2

The same operations as in Example 1 were performed except that melting recovery of aluminum was not performed and the oversize product (coarse grain product) of the sieve Obtained by classification was not subjected to magnetic sorting but was subjected first to wind force sorting, and subsequently, the heavy product and the light product recovered by the wind force sorting were each subjected to magnetic sorting, to thereby sort the products into magnetically attractable materials and non-magnetically attractable materials and recover aluminum and copper.

Comparative Example 3

The same operations as in Example 1 were performed except that the oversize product (coarse grain product) of the sieve obtained by classification was not subjected to magnetic sorting but was subjected first to wind force sorting, and subsequently, the heavy product and the light product recovered by the wind force sorting were each subjected to magnetic sorting, to thereby sort the products into magnetically attractable materials and non-magnetically attractable materials and recover aluminum and copper.

Comparative Example 4

The same operations as in Example 1 were performed except that melting recovery of aluminum was not performed, the oversize product (coarse grain product) of the sieve obtained by classification was passed through a sieve having a mesh size of 10 mm to remove a large coarse grain product having a size of 10 mm or greater, the product that had passed through the 10 mm sieve (the product having a size of from 1.2 mm through 1.0 mm) was not subjected to magnetic sorting but was subjected first to wind force sorting, and subsequently, the heavy product and the light product recovered by the wind force sorting were each subjected to magnetic sorting, to thereby sort the products into magnetically attractable materials and non-magnetically attractable materials and recover aluminum and copper.

Comparative Example 5

The same operations as in Example 1 were performed except that melting recovery of aluminum was not performed (melted aluminum was not separated), to thereby sort and recover aluminum as a heavy product (one valuable product) and copper as a light product (another valuable product).

<Evaluation>

For the heavy products and the light products sorted and recovered in Examples 1 to 4 and Comparative Examples 1 and 5 and the magnetically attractable materials and the non-magnetically attractable materials sorted and recovered in Comparative Examples 2 to 4, the grades and the recovery rates of aluminum and copper were evaluated.

<<Grade>>

First, the heavy products sorted and recovered in Examples 1 to 4 and Comparative Examples 1 and 5 were each dissolved in an acid, to measure the grades (mass ratio, % by mass) of aluminum (Al) and copper (Cu) in each heavy product with ICP-AES, ICAP6300 (obtained from Thermo Fisher Scientific K.K.). The results are presented in Table 1.

By the same method as the method for obtaining the grades of aluminum and copper in the heavy products, the grades (% by mass) of aluminum and copper in the light products sorted and recovered in Examples 1 to 4 and Comparative Examples 1 and 5 were obtained. The results are presented in Table 1.

The grades of aluminum and copper in the magnetically attractable materials and the non-magnetically attractable materials sorted and recovered in Comparative Examples 2 to 4 were evaluated.

First, the grades (% by mass) of aluminum and copper in the magnetically attractable materials obtained by magnetically sorting the heavy products sorted by wind force sorting in Comparative Examples 2 to 4 were obtained by the same method as the method for obtaining the grades of aluminum and copper in the heavy products sorted and recovered in Examples 1 to 4 and Comparative Examples 1 and 5. The results are presented in Table 1.

Likewise, the grades (% by mass) of aluminum and copper in the non-magnetically attractable materials obtained by magnetically sorting the heavy products sorted by wind force sorting in Comparative Examples 2 to 4 were obtained. The results are presented in Table 1.

Next, the grades of aluminum and copper in the magnetically attractable materials obtained by magnetically sorting the light products sorted by wind force sorting in Comparative Examples 2 to 4 were obtained by the same method as the method for obtaining the grades (% by mass) of aluminum and copper in the heavy products sorted and recovered in Examples 1 to 4 and Comparative Examples 1 and 5. The results are presented in Table 1.

Likewise, the grades (% by mass) of aluminum and copper in the non-magnetically attractable materials obtained by magnetically sorting the light products sorted by wind force sorting in Comparative Examples 2 to 4 were obtained. The results are presented in Table 1.

TABLE 1

| | Battery form | Al melting recovery | Sorter | Magnetic sorting | | Analyzed value (% by mass) | |
|---|---|---|---|---|---|---|---|
| | | | | | | Al | Cu |
| Ex. 1 | Pack | performed | Wind force | Magnetic sorting before wind force sorting | Heavy product | 85.7 | 14 |
| | | | | | Light product | <0.1 | ≥98 |
| Ex. 2 | Module | performed | Wind force | Magnetic sorting before wind force sorting | Heavy product | 83 | 14.6 |
| | | | | | Light product | 0.2 | ≥98 |
| Ex. 3 | Cell | performed | Wind force | Magnetic sorting before wind force sorting | Heavy product | 85.1 | 10.8 |
| | | | | | Light product | 0.4 | ≥98 |
| Ex. 4 | Pack | performed | Air table | Magnetic sorting before wind force sorting | Heavy product | 80.8 | 18 |
| | | | | | Light product | 2.4 | ≥96 |
| Comp. Ex. 1 | Pack | not performed | Wind force | Magnetic sorting was not performed | Heavy product | 49.7 | 11.8 |
| | | | | | Light product | 32.5 | 62.3 |
| Comp. Ex. 2 | Pack | not performed | Wind force | Magnetic sorting after wind force sorting | Heavy product (magnetically attractable materials) | 13.5 | 0.3 |
| | | | | | Heavy product (non magnetically attractable materials) | 77 | 20.8 |
| | | | | | Light product (magnetically attractable materials) | No analyzed value | No analyzed value |
| | | | | | Light product (non-magnetically attraciable materials) | 32.9 | 63.2 |
| Comp. Ex. 3 | Pack | performed | Wind force | Magnetic sorting after wind force sorting | Heavy product (magnetically attractable materials) | 0.15 | 0.18 |
| | | | | | Heavy product (non magnetically attractable materials) | 68 | 80 |
| | | | | | Light product (magnetically attractable materials) | No analyzed value | No analyzed value |
| | | | | | Light product (non-magnetically attractable materials) | 0.2 | 96.3 |
| Comp. Ex. 4 | Pack | not performed | Wind force | 10 mm or greater was removed with sieve, magnetic sorting after wind force sorting | Heavy product (magnetically attraciable materials) | No analyzed value | No analyzed value |
| | | | | | Heavy product (non magnetically attractable materials) | 77.6 | 19 |
| | | | | | Light product (magnetically attractable materials) | No analyzed value | No analyzed value |
| | | | | | Light product (non-magnetically attractable materials) | 2.8 | 94 |
| Comp. Ex. 5 | Pack | not performed | Wind force | Magnetic sorting before wind force sorting | Heavy product | 83.5 | 16.5 |
| | | | | | Light product | 11.5 | 86 |

For Examples 1 to 4, aluminum melted and recovered in the thermal treatment was partially harvested and dissolved in an acid, to measure the grade (% by mass) with ICP-AES, ICAP6300 (obtained from Thermo Fisher Scientific K.K.). The results are presented in Table 2.

TABLE 2

| | Battery form | Al melting recovery | Sorter | Magnetic sorting | Measuring target | Analyzed value (% by mass) Al |
|---|---|---|---|---|---|---|
| Ex. 1 | Pack | performed | Wind force | Magnetic sorting before wind force sorting | Melted aluminum | ≥99.5 |
| Ex. 2 | Module | performed | Wind force | Magnetic sorting before wind force sorting | Melted aluminum | ≥99.5 |
| Ex. 3 | Cell | performed | Wind force | Magnetic sorting before wind force sorting | Melted aluminum | ≥99.5 |
| Ex. 4 | Pack | performed | Air table | Magnetic sorting before wind force sorting | Melted aluminum | ≥99.5 |

<<Recovery Rate>>

The recovery rate of aluminum was obtained from the amount and grade of each product with respect to the total amount of aluminum (Al) derived from the housings (pack housing and cell housings) of the lithium ion secondary batteries before being processed (except aluminum of electrode materials). For Examples 1 to 4 and Comparative Example 3, the recovery rate of aluminum with respect to the total amount of aluminum derived from the housings of the lithium ion secondary batteries before being processed was obtained based on the total of the amount of aluminum contained in the heavy product and the amount of aluminum melted and recovered in the thermal treatment. For Comparative Examples 1 and 5, the recovery rate was obtained using the amount of aluminum contained in the heavy product sorted and recovered and the grade obtained in Comparative Examples 1 and 5.

Note that the total amount of aluminum derived from the housings of the lithium ion secondary batteries before being processed (except aluminum of electrode materials) was obtained from a weight value and a grade value, which were each obtained by dismantling the lithium ion secondary batteries and measuring the weight of parts containing Al, and by partially harvesting the aluminum parts, dissolving the parts in an acid, and measuring the grades (% by mass) with ICP-AES, ICAP6300 (obtained from Thermo Fisher Scientific K.K.).

The amount of aluminum melted and recovered in the thermal treatment was obtained by measuring the weight of melted aluminum recovered, and analyzing the grade. For analyzing the grade, melted aluminum was partially harvested and dissolved in an acid, and the grade was measured with ICP-AES, ICAP6300 (obtained from Thermo Fisher Scientific K.K.).

The recovery rate of copper was obtained by obtaining the amount of copper contained in a light product, with respect to the total amount of copper (Cu) contained in the lithium ion secondary batteries before being processed (including copper of electrode materials) by the same method as the method for calculating the recovery rate of aluminum. The results are presented in Table 3.

Next, the recovery rates of aluminum and copper in the magnetically attractable materials and the non-magnetically attractable materials sorted and recovered in Comparative Examples 2 to 4 were evaluated.

For Comparative Examples 2 to 4, as described above, it is considered that aluminum was sorted in the non-magnetically attractable materials obtained by magnetically sorting the heavy product sorted by wind force sorting, and that copper was sorted in the non-magnetically attractable materials obtained by magnetically sorting the light product sorted by wind force sorting.

Hence, the recovery rate of aluminum was obtained by obtaining the amount of aluminum contained in the non-magnetically attractable materials obtained by magnetically sorting the heavy product sorted by wind force sorting, with respect to the total amount of aluminum contained in the lithium ion secondary batteries before being processed, by the same method as the method for obtaining the recovery rate of aluminum in the evaluation of Example 1. The results are presented in Table 3.

Likewise, in Comparative Example 2, the recovery rate of copper was obtained by obtaining the amount of copper contained in the non-magnetically attractable materials obtained by magnetically sorting the light product sorted by wind force sorting, with respect to the total amount of copper (Cu) contained in the lithium ion secondary batteries before being processed. The result is presented in Table 3.

TABLE 3

| | Battery form | Al melting recovery | Sorter | Magnetic sorting | Recovery rate (%) Al | Cu |
|---|---|---|---|---|---|---|
| Ex. 1 | Pack | performed | Wind force | Magnetic sorting before wind force sorting | 96.7 | 94.2 |
| Ex. 2 | Module | performed | Wind force | Magnetic sorting before wind force sorting | 96.8 | 92.7 |
| Ex. 3 | Cell | performed | Wind force | Magnetic sorting before wind force sorting | 99.7 | 90.2 |
| Ex. 4 | Pack | performed | Air table | Magnetic sorting before wind force sorting | 95.7 | 88.4 |
| Comp. Ex. 1 | Pack | not performed | Wind force | Magnetic sorting was not performed | 81.9 | 54.5 |
| Comp. Ex. 2 | Pack | not performed | Wind force | Magnetic sorting after wind force sorting | 71.4 | 54.5 |
| Comp. Ex. 3 | Pack | performed | Wind force | Magnetic sorting after wind force sorting | 88.4 | 89.7 |
| Comp. Ex. 4 | Pack | not performed | Wind force | 10 mm or greater was removed with sieve, magnetic sorting after wind force sorting | 23.1 | 77 |
| Comp. Ex. 5 | Pack | not performed | Wind force | Magnetic sorting before wind force sorting | 89.1 | 52 |

As can be seen, it was revealed that Examples 1 to 4, which were Examples of the present invention, were greater than Comparative Examples 1 to 5 in both of the grade and the recovery rate of valuable resources (total of aluminum and copper) sorted and recovered from the lithium ion secondary batteries. Particularly, in Examples 1 to 4, aluminum melted and recovered and aluminum recovered by wind force sorting both had a high grade of 80% by mass or greater.

In Comparative Example 3, melting recovery of aluminum was performed, pulverization, sieving, and wind force sorting were subsequently performed to sort into magnetically attractable materials and non-magnetically attractable materials, and magnetic sorting was performed afterwards. In this case, although the aluminum abundance in the product fed to wind force sorting was lower than in Comparative Example 2 in proportion to the amount melted, the aluminum grade in the non-magnetically attractable materials obtained through the wind force sorting and the subsequent magnetic sorting was low. This was because although aluminum was melted and removed, iron failed to be removed, so copper which was desirable to recover as a light product by wind force sorting fell into the heavy product together with iron.

In Comparative Example 4, from the pulverized product, a product having a size of 1.2 mm or greater and 10 mm or less was produced using a sieve having a mesh size of 1.2 mm and a sieve having a mesh size of 10 mm, and fed to wind force sorting. However, although a coarse product having a size of 10 mm or greater was removed using the sieves, the performance of wind force sorting was not improved. Hence, it was reveled that even iron and aluminum products that had a size of from 1.2 mm through 10 mm inhibited copper from being recovered as the light product by a wind force, when the ratios of such products were high.

The recovery rate and the grade of Example 4 were both lower than those of Examples 1 to 3 by some percentage. Hence, it was better to use a wind sorter that could effectively utilize the difference in the terminal velocity (floating velocity) unique to the sorting targets (i.e., a mechanism configured to separate the sorting targets by blowing the sorting targets with a wind in a direction intersecting the falling direction) than to use a sorter like an air table configured to sort the sorting targets using an airflow (wind force) and vibration of a table and utilizing the differences in resistance to the airflow and frictional force on the table between the sorting targets due to the differences in specific gravity and shape between the sorting targets.

In Comparative Example 5, melting recovery of aluminum was not performed, magnetic sorting was performed, and subsequently the non-magnetically attractable materials were subjected to wind force sorting. In this case, the aluminum grade was 80%, which was high, whereas the recovery rate of copper in the light product was 52%, which was extremely low. This was because even though iron was removed by previous magnetic sorting, aluminum was not removed by melting, so copper which was desirable to recover as a light product by wind force sorting fell into the heavy product together with aluminum. This suggested that coarse aluminum inhibited transportation of copper by a wind force sorting airflow.

In Examples 1 to 4, aluminum that could be recovered by melting accounted for a large fraction of the total amount of aluminum derived from the housings before being processed. The melted aluminum had an extremely high purity and could be sold at a higher price than aluminum in the heavy product. Table 4 presents the abundance ratios (recovery rates) of aluminum derived from melting and aluminum derived from the heavy product with respect to the total amount of aluminum before being processed.

resources from the pulverized product by a magnetic force, and a wind force sorting step of sorting one valuable resource from another valuable resource in the valuable resources by a wind force.

Hence, the sorting method for valuable resources of the present invention can sort valuable resources in a manner that respective kinds of valuable resources can be recovered with a high grade at a high recovery rate from a target containing a plurality of kinds of valuable resources.

REFERENCE SIGNS LIST

100: closed wind sorter
110: feeder
120: sirocco fan
130: heavy product container
140: light product container
200: heavy product
300: light product

The invention claimed is:
1. A sorting method for valuable resources, the sorting method comprising:
thermally treating a target containing valuable resources, to melt aluminum and separate a melt;
pulverizing a thermally treated product remaining after the melt is separated, to obtain a pulverized product;
sorting the valuable resources from the pulverized product by a magnetic force; and
sorting the valuable resources sorted by the magnetic force into one valuable resource and another valuable resource in the valuable resources by a wind force,
further comprising after the pulverizing,
sieving the pulverized product, to classify the pulverized product into an oversize product and an undersize product,
wherein after the classifying, the oversize product is subjected to the sorting by the magnetic force, and
wherein in the classifying, sieving is performed with a sieve having a mesh size of 0.6 mm or greater but 2.4 mm or less.
2. The sorting method for valuable resources according to claim 1,
wherein the target is a lithium ion secondary battery.
3. The sorting method for valuable resources according to claim 2,

TABLE 4

| | | | | Aluminum recovery rate (%) | |
| --- | --- | --- | --- | --- | --- |
| Battery form | Al melting recovery | Sorter | Magnetic sorting | derived from melted aluminum | derived from heavy product |
| Ex. 1 | Pack | performed | Wind force | Magnetic sorting before wind force sorting | 92.4 | 4.3 |
| Ex. 2 | Module | performed | Wind force | Magnetic sorting before wind force sorting | 87.5 | 9.3 |
| Ex. 3 | Cell | performed | Wind force | Magnetic sorting before wind force sorting | 90.2 | 9.5 |
| Ex. 4 | Pack | performed | Air table | Magnetic sorting before wind force sorting | 92.4 | 3.3 |

As described above, the sorting method for valuable resources of the present invention includes a thermal treatment step of thermally treating a target containing valuable resources, to melt aluminum and separate a melt, a pulverizing step of pulverizing a thermally treated product remaining after the melt is separated, to obtain a pulverized product, a magnetic sorting step of sorting the valuable wherein the lithium ion secondary battery includes a housing containing aluminum.
4. The sorting method for valuable resources according to claim 1,
wherein the valuable resources subjected to the sorting by the wind force are non-magnetically attractable materials obtained in the sorting by the magnetic force.

5. The sorting method for valuable resources according to claim 1,
  wherein the one valuable resource is aluminum, and the another valuable resource is copper.

6. The sorting method for valuable resources according to claim 1,
  wherein the target is thermally treated in the thermally treating at 660° C. or higher but lower than 1,085° C.

7. The sorting method for valuable resources according to claim 1,
  wherein in the sorting by the wind force, the valuable resources are let to fall, and when the valuable resources are let to fall, the valuable resources are sorted by being blown with a wind in a direction intersecting a falling direction of the valuable resources.

* * * * *